United States Patent
Richins

[15] 3,672,307
[45] June 27, 1972

[54] VEHICLE WITH COORDINATED GUIDING AND SUPPORTING MECHANISM

[72] Inventor: Kenneth A. Richins, Salt Lake City, Utah
[73] Assignee: Eaton Corporation, Cleveland, Ohio
[22] Filed: April 6, 1970
[21] Appl. No.: 25,908

[52] U.S. Cl. ............................ 104/96, 104/172 BT, 104/88, 104/99, 104/130
[51] Int. Cl. .................................................. B61b 15/00
[58] Field of Search .................. 104/88, 96, 97, 99, 101, 102, 104/130, 131, 172 BT, 244.1; 180/114, 79; 214/16.42

[56] References Cited

UNITED STATES PATENTS

| | | | |
|---|---|---|---|
| 3,156,193 | 11/1964 | Anderson | 104/172 BT |
| 3,202,232 | 8/1965 | Rogers | 180/119 |
| 3,059,587 | 10/1962 | Dickson | 104/88 |
| 582,436 | 5/1897 | Ridgway | 104/99 |
| 2,068,403 | 1/1937 | Ekstrom | 104/244.1 |
| 3,353,501 | 11/1967 | Kideka | 214/16.42 |

FOREIGN PATENTS OR APPLICATIONS

| | | | |
|---|---|---|---|
| 751,212 | 1/1967 | Canada | 214/16.42 |

Primary Examiner—Arthur L. La Point
Assistant Examiner—D. W. Keen
Attorney—Teagno & Toddy

[57] ABSTRACT

A load handling vehicle is equipped with a steering and traction wheel and an overhead guide assembly coacting with fixed overhead linear tracks. The steering and traction wheel and the guide assembly rotate together so as to guide the vehicle and support it in its movement in different paths. The overhead tracks are connected by a circular track to permit transfer of the guide assembly from one linear track to another.

10 Claims, 3 Drawing Figures

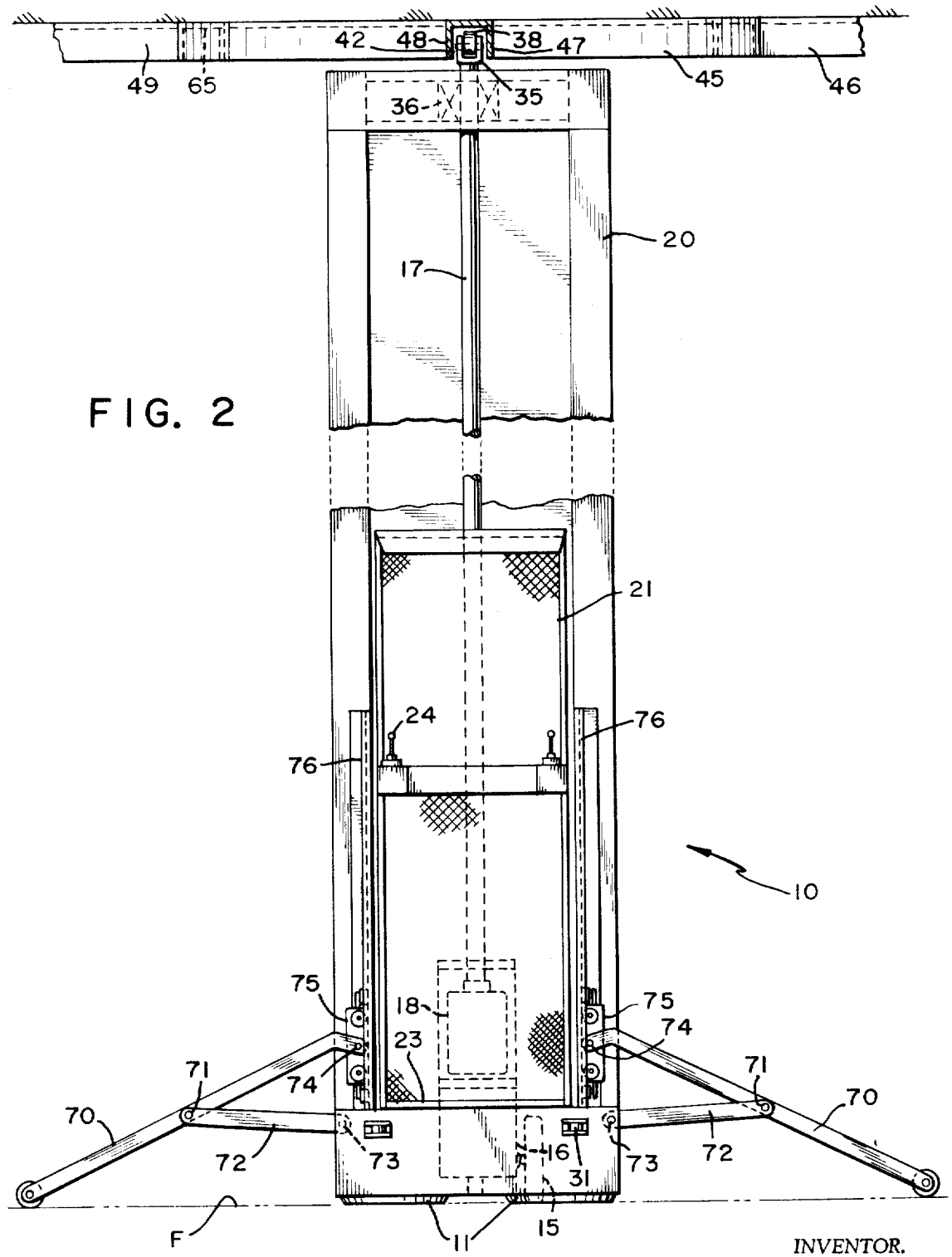

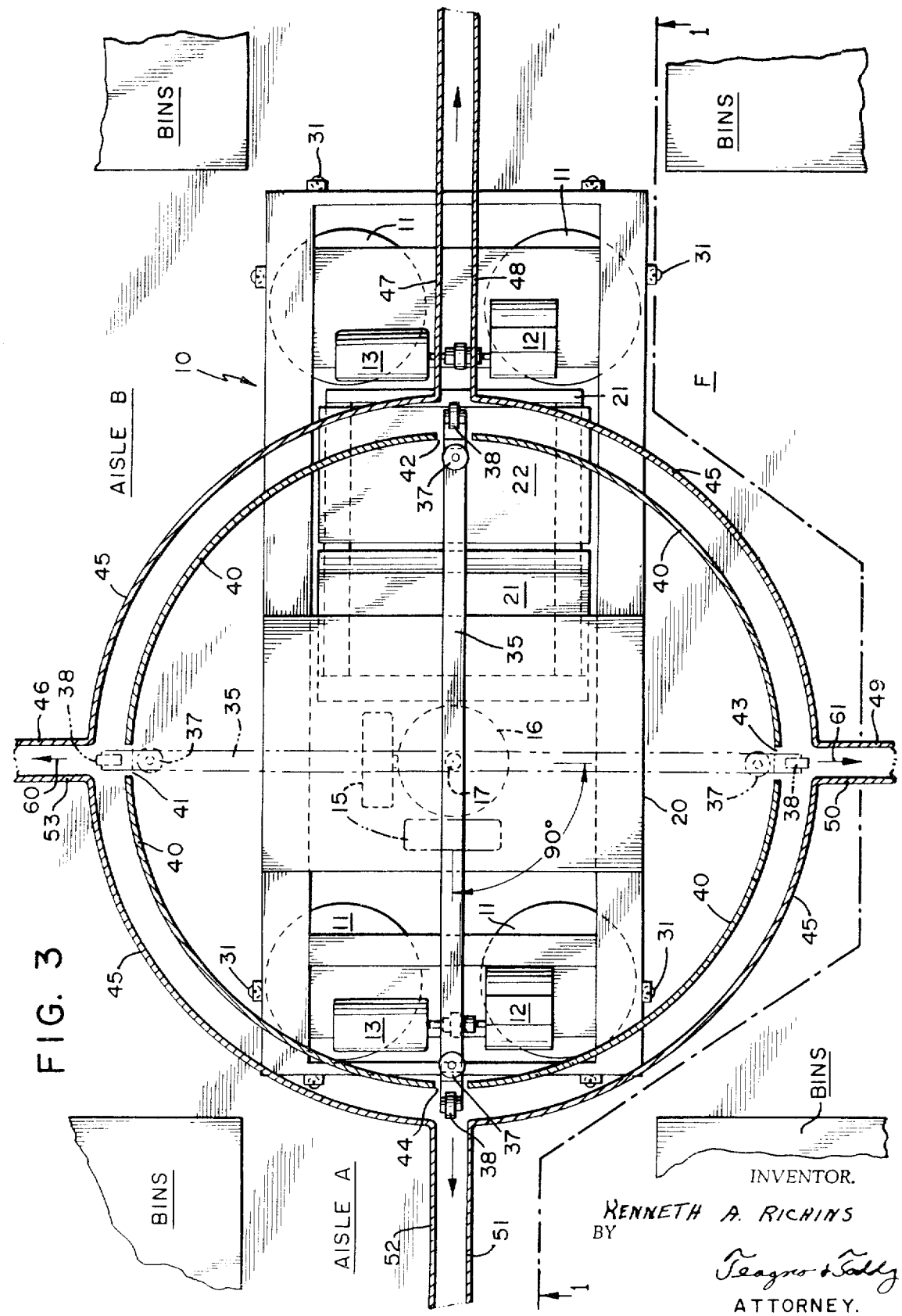

3,672,307

1

VEHICLE WITH COORDINATED GUIDING AND SUPPORTING MECHANISM

FIELD OF INVENTION

This invention relates to a load handling vehicle adapted for movement in aisles of a warehouse for the purpose of bringing loads into position for stacking in bins or other load accepting facilities. More particularly, the invention relates to a vehicle of the type adapted to be supported by air cushion means such as air pads, and to be moved while so supported, in warehouse aisles.

BACKGROUND OF THE INVENTION

Vehicles adapted to move in warehouse aisles, are naturally very old in the art. Because of the high cost of land, warehouses are erected with very high ceilings, and vehicles of the particular class to which this invention relates, have been designed therefore to elevate loads to rather considerable heights, in order to operate effectively in warehouses having extremely high ceilings. Naturally, the stability of a vehicle is greatly affected when a load is elevated to a relatively high point, and therefore, stabilizing devices for vehicles of the particular class have been developed. It does not appear, however, that the art contains a stabilizing mechanism for a vehicle of the particular class, that moves with the vehicle for effective coaction with means in each of several aisles traversed by the vehicle. This seems particularly true of vehicles adapted to assume different positions in each of two intersecting aisles through which the vehicle moves. Still further, there seems to be no really effective stabilizing means adapted for guiding and stabilizing an air supported vehicle.

OUTLINE OF INVENTION

A feature of this invention resides in the utilization of a guide assembly mounted at the upper end of a load handling vehicle for coaction with linear guide means. More particularly the invention resides in a guide assembly adapted for rotation in a particular axis relatively to the vehicle so as to be readily aligned with two or more linear guide means of a type that may be mounted on the ceiling of a warehouse in which the vehicle is to be moved. As a particular feature of the invention, the linear guide means with which the guide assembly coacts, may be in the form of two or more tracks or the like, lying in angular relation to one another, so that rotation of the guide assembly aligns the guides thereof with the linear tracks. As a detailed feature of the invention, the guide assembly may comprise a pair of linearly spaced rollers, which when moving along a linear track, contribute considerable stability to the vehicle.

As a further feature of the invention, the guide assembly is rotated in accordance with the rotation of a steering assembly, which may include a combined steering and traction wheel. An even more detailed feature of the invention resides in the utilization of a means for rotating the steering wheel directly with and coincidentally with the guide assembly, so that when the steering wheel is positioned for the movement of the vehicle down a particular aisle, the guide assembly will be aligned with the track of that aisle.

A further feature of the invention resides in a form of transfer means for effectively transferring the guide assembly and its rollers from cooperation with one linear track, into coaction with another linear track that may be at right angles to the first linear track. As a detailed feature of this part of the invention, the transfer mechanism comprises a circular track in which the very same rollers or the like that bring about the guiding and stabilizing of the vehicle along one linear line, are rotated into position for coaction with other tracks to stabilize and to guide the vehicle along another line.

A still further feature of the invention resides in novel outriggers that are utilized as part of the vehicle for stabilizing it during the realignment of the guide assembly, prior to the movement of the vehicle into a different aisle. This feature of the invention is particularly important because of the use of

2 air support means for the vehicle, and the requirement that the vehicle be maintained particularly stable during the rotation of the guide assembly and the steering and traction wheel.

As a further particular feature of the invention, the transfer mechanism and the guidance mechanism are formed to allow for the air lift of the vehicle in all positions thereof.

DESCRIPTION OF DRAWINGS

FIG. 2 is an end elevation of the vehicle taken along line 2—2 of FIG. 1.

FIG. 3 is a section taken along line 3—3 of FIG. 1 illustrating the transfer mechanism. It will be noted in FIG. 3, that FIG. 1 is taken along line 1—1 of FIG. 3.

DESCRIPTION OF INVENTION

Figure 1:
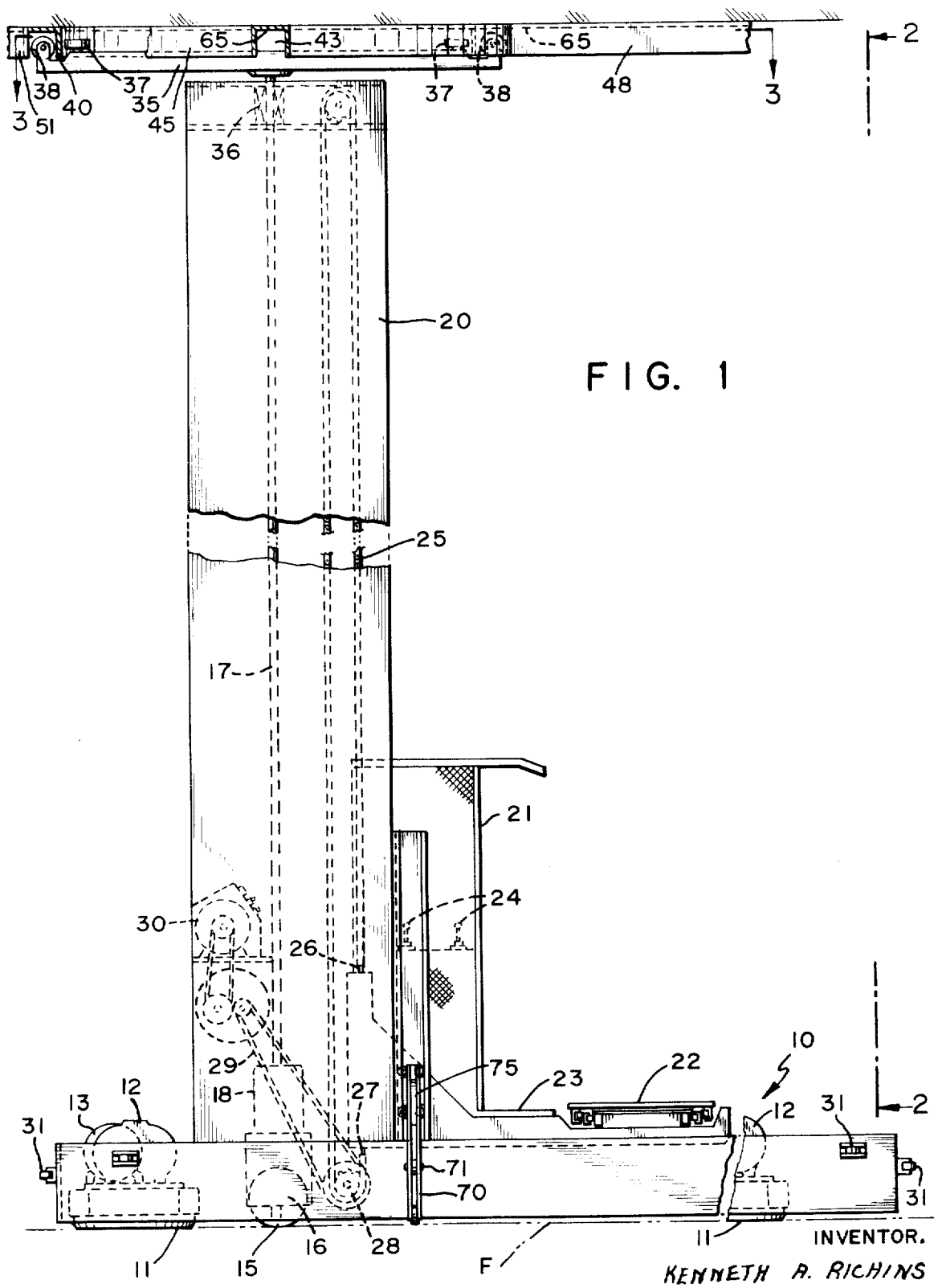
FIG. 1 is a side vertical view illustrating the vehicle of the invention positioned with its guide assembly directly under and in alignment with transfer mechanism secured to the ceiling of the warehouse.

Referring now more particularly to FIGS. 1 and 2 of the drawings, the vehicle in which the invention is embodied, is designated generally be reference numeral 10. While a brief description of the vehicle per se will be presented here, a somewhat more complete description of the vehicle is found in application Ser. No. 886,884, filed Dec. 22, 1969 and application 69–94 assigned to Eaton Yale & Towne Inc., the assignee of this application.

In any event, the vehicle is of the type having a series of four air cushion pads 11, that receive air from blowers 12 actuated by electric motors 13. The movement of air through the air pads 11, as is conventional in the art, will lift the vehicle 10 away from the floor F of the warehouse a relatively short distance, and will thus make it possible for the vehicle to be moved with very little effort down the various aisles of the warehouse. As is more fully described in application Ser. No. 886,884 referred to above, the vehicle is adapted to be moved in the warehouse through contact of a steering and driving wheel 15 with the floor F. In said application, the wheel 15 is part of a steering and driving assembly 16 that is mounted for gravitational movement against the floor F and also for rotation in a steering axis. The wheel 15 is suitably power driven so that through its contact with the floor it will move the vehicle, naturally in the direction in which the wheel 15 has been positioned relatively to a steering axis.

Thus, the entire steering and traction unit 16, including the wheel 15, is adapted for rotation in a steering axis, which is the axis of a vertical shaft 17. In one of the said earlier applications referred to, steering rotation of unit 16 is actually contributed through the torque developed by the rotation of the wheel 15 and its contact with the floor F. The invention set forth in the present application will be operative regardless of the manner in which the steering and traction unit 16 is rotated. However, as part of this invention, it is preferred that a motor 18 be utilized for rotating the steering and traction unit bodily in the axis of the shaft 17, and that at the same time, the shaft 17 be rotated for a purpose to appear presently.

The vehicle 10 includes a mast 20 that is integral with the main frame of the vehicle, and extends upwardly toward the ceiling of the warehouse. Suitably mounted on the mast 20 is a load elevating carriage 21 having transversely moving load carrying platforms 22, an operator's platform 23, and suitable controls 24, all as has been set forth in more detail in the above earlier applications. Actually, the construction of the mast and the carriage 21 and the load moving parts need not be considered in detail here, as they are not features of the invention. It is only important to appreciate the fact that the carriage 21 will be elevated to a relatively high point, and therefore makes necessary certain of the features of the invention.

For lifting the carriage, a conventional sprocket chain assembly 25 is utilized. Thus, chain 25 is secured at 26 to an upper portion of the carriage 21, and at 27 to the lowermost portion of the carriage 21. Chain 25 is driven by a sprocket 28 that is in turn actuated by a second sprocket and chain 29 driven through intermediate sprockets and chains by an electric motor 30. Through operation of chain 25 by the motor 30, it is obvious that the carriage will be elevated to any particular desired position, and that a load on the platform 22 can then be deposited as desired in bins or the like located at each side of the aisle in which the vehicle is moved.

The main frame of the vehicle is provided with a series of guide rollers 31 located about its periphery, and it is the function of these rollers to coact with suitable guides provided in the aisles for maintaining the vehicle in a fixed path in each aisle in which it moves. Obviously, it is the function of the rollers 31 to prevent any deviation of the vehicle from a particular path in which the steering and driving wheel 15 moves the vehicle as the vehicle is supported by the air cushions provided by the pads 11.

In order to stabilize and guide the upper end of the vehicle, for the reasons earlier set forth in the outline of the invention, the upper end of the shaft 17 has fixed thereto a beam 35 that is part of which here may be called a guide assembly. Through a bearing 36 provided at the upper end of the mast 20, the shaft 17 and the beam 35 will be maintained in a stable position for rotation in the axis of the shaft 17. As is probably best seen in FIG. 3, each end of the beam 35 carries a guide roller 37 adapted for rotation in a vertical axis. Also at each end of the beam 35 and beyond the rollers 37, a roller 38 is mounted, each roller 38 being adapted for rotation about a horizontal axis. In the position of the beam 35 in FIGS. 1 and 3, it is located opposite what is termed a transfer mechanism, it being the function of the transfer mechanism to aid in the controlled movement of the beam from its position of FIGS. 1 and 3 to a position at right angles thereto, shown in dash and dotted lines in FIG. 3.

The transfer mechanism provides an inner arcuate track 40 that is formed in four segments separated by spaces 41, 42, 43 and 44. Cooperating with the inner track segments 40 are outer track segments 45, each end of a segment 45 terminating in a linear track portion. These linear track portions are noted by reference numerals 46, 47, 48, 49, 50, 51, 52 and 53. It will be well appreciated, that were the vehicle 10 positioned some distance to the left of its position in FIG. 3, all four rollers 37 and 38 would be between the two linear track portions 51 and 52, and the said track portions 51 and 52 would through the said rollers 37 and 38 and beam 35, effectively guide the upper end of the mast 20 for effective movement in an aisle A.

The steering and traction wheel 15, as shown in one position in dotted lines in FIG. 3, will be positioned in axial alignment with the aisle A so as to contribute motion to the vehicle in the aisle A. Thus, the vehicle would be supported by the air issuing through devices 11, and would therefore be spaced from the floor F, and would receive traction through operation of the wheel 15. At the same time, guidance would be contributed to the lower end of the vehicle through coaction of the several rollers 31 with suitable guides secured in the aisle A. Also, at the same time, the rollers 37 and 38 would effectively stabilize the upper end of the vehicle through beam 35 and the mast 20, and would guide the vehicle for movement in the aisle A in cooperation with the traction wheel 15 and rollers 31.

Let us assume now that the vehicle has moved to the position shown in FIGS. 1 and 3, so that the rollers 38 are in the trackway formed between track segments 40 and 45. Rollers 37 are in position to contact the vertical sides of track segment 40 as seen in FIG. 1. Let us assume further it is desired that the vehicle move in aisle B in the direction of either of arrows 60 or 61 shown in FIG. 3. The operator will simply close the circuit of the motor 18 to effect rotation of the beam 35 in a particular direction 90° in the axis of shaft 17 from its full line position of FIG. 3, to the phantom position shown in the same figure.

At the same time, as already set forth, the steering and traction mechanism 16 will be rotated to bring the wheel 15 from its dotted line position shown in FIG. 3 to its dash and dotted line position shown in the said figure. During this rotation of the parts, it is obvious that the shaft 17 and the entire guide assembly comprising the beam 35 and its rollers 37 and 38 have been well reinforced in their travel through cooperation of the two rollers 37 with vertical surfaces of the track segments 40. Obviously, once the beam 35 is in the phantom position shown in FIG. 3, and the wheel 15 also in the phantom position of FIG. 3, it is possible for the vehicle to move in aisle B. It will be apparent also at this point, that the spaces 41, 42, 43 and 44 are required in order to permit the movement of the beam 35 and its rollers to the transfer point from directions as determined by the aisles, and away from the transfer point thereafter.

It will be well to note in FIG. 1 that there is a space between the roller 38 and a plate 65 forming the upper end surface of the trackway between the inner and outer track segments 44, 45. This space permits the upward movement of the rollers 38 with the beam 35 when the vehicle 10 is raised from the floor F by the several air pads 11. It will be noted also in FIG. 1, that the rollers 37 lie somewhat below the rollers 38 so as also to move freely vertically with the beam 35 within limits determined by rollers 38.

In order to facilitate propulsion of the vehicle 10 in aisle B after rotation of the drive and steer unit 16, shaft 17 and the beam 35 of the guide assembly, the vehicle is equipped with outrigger arms 70, best illustrated in FIG. 2. Each arm 70 is pivoted at 71 to a guide link 72 that is in turn pivoted at 73 to the main frame of the vehicle. The end of each outrigger terminating at the vehicle is pivoted at 74 to a slide 75 that may be moved vertically through a hydraulic ram or motor, or through a chain and motor. In any event, through the vertical movement of each slide 75 in a channel 76 fixed to the main frame of the vehicle, the outrigger arms 70 may be moved readily between their outward vehicle stabilizing position shown in FIGS. 1 and 2, to an inward position within channels 76 as is apparent.

Those skilled in the art, it is thought, will appreciate that the construction of this application contributes an extremely simple guiding and stabilizing mechanism for a high lift vehicle, while contributing also extremely simple means whereby the vehicle may well be transferred from one aisle to another without loss of stability. The relative simplicity of the means utilized in effecting transfer, and at the same time, steering and traction of the vehicle, will also be well appreciated.

I now claim:

1. In the combination of the class described, a vehicle having support means and traction means at its bottom, a support member extending vertically upwardly from said bottom toward the ceiling of a room in which the bottom of the vehicle is supported by said support means, a guide assembly rotatably mounted on said support member, guides on said guide assembly, linear guide means for said guides secured relatively to the said ceiling, said linear guide means comprising two or more linear tracks or the like lying in angular relation to one another so that rotation of said guide assembly aligns said guides with one or the other of said linear tracks or the like, and transfer means with which said guides coact while rotating with said guide assembly into coaction with one linear guide means from coaction with the other linear guide means, said transfer means comprising circular tracks or the like connecting said linear guide means, and said guides comprising rollers in contact with said circular tracks or the like.

2. In the combination of claim 1, the feature that said traction means includes a traction wheel rotatable in a steering axis to drive said vehicle in alignment with said guide means.

3. In the combination of claim 1, the feature that said support means comprise air pads.

4. In the combination of claim 1, the feature that said support member is a mast, and that a load handling carriage is mounted for vertical movement on said mast.

5. In the combination of claim 1, outriggers on said vehicle for stabilizing said vehicle during rotation of said guides relatively to said transfer means, said outriggers being positioned for swinging transversely of the vehicle parallel to one of said linear guide means.

6. In the combination of claim 1, the feature that a part of said traction means rotates in accordance with rotation of said guide assembly whereby to align both said traction means and guides with said linear guide means.

7. In the combination of claim 6, the feature that said part of said traction means and said guide assembly are rotated together into proper alignment with said linear guide means.

8. In the combination of claim 6, the feature that said part of said traction means is a steering wheel, and means for rotating said steering wheel in accordance with said guide assembly.

9. In the combination of claim 8, the feature that said support member is a mast on which a load handling carriage is mounted for vertical movement, and said means for rotating said steering wheel together with said guide assembly comprise a shaft rotatably mounted on said mast.

10. In the combination of claim 1, the feature that said traction means is a steering and traction wheel mounted for steering rotation on said vehicle, and means interconnecting said steering and traction wheel and said guide assembly for rotating both said wheel and guide assembly simultaneously in predetermined relation.

* * * * *